US009573767B2

United States Patent
MacLachlan

(10) Patent No.: US 9,573,767 B2
(45) Date of Patent: Feb. 21, 2017

(54) CONVEYOR BELT MODULE WITH STEPPED HINGE PASSAGEWAY

(71) Applicant: Laitram, L.L.C., Harahan, LA (US)

(72) Inventor: Gilbert J. MacLachlan, Harahan, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/011,834

(22) Filed: Feb. 1, 2016

(65) Prior Publication Data

US 2016/0229637 A1 Aug. 11, 2016

Related U.S. Application Data

(60) Provisional application No. 62/112,486, filed on Feb. 5, 2015.

(51) Int. Cl.
| | |
|---|---|
| *B65G 17/08* | (2006.01) |
| *B65G 17/40* | (2006.01) |
| *B29C 45/00* | (2006.01) |
| *B29L 31/00* | (2006.01) |

(52) U.S. Cl.
CPC ......... *B65G 17/086* (2013.01); *B29C 45/0017* (2013.01); *B65G 17/40* (2013.01); *B29L 2031/7092* (2013.01)

(58) Field of Classification Search
CPC ....... B65G 17/086; B65G 17/40; B65G 17/38; B65G 17/385; B29C 45/0017; B29L 2031/7092
USPC ...................................................... 193/852
See application file for complete search history.

(56) References Cited

U.S. PATENT DOCUMENTS

| | | | |
|---|---|---|---|
| 5,174,439 A | 12/1992 | Spangler et al. | |
| 5,816,390 A | 10/1998 | Stebnicki | |
| 5,921,379 A | 7/1999 | Horton | |
| 6,036,001 A | 3/2000 | Stebnicki et al. | |
| 6,880,696 B2* | 4/2005 | Cediel | B29C 45/0013 |
| | | | 198/852 |
| 7,828,136 B2 | 11/2010 | Damkjaer | |
| 7,837,028 B2* | 11/2010 | Elsner | B65G 17/086 |
| | | | 198/850 |
| 8,678,178 B2 | 3/2014 | Bickel, Jr. et al. | |
| 9,085,414 B2* | 7/2015 | Sharma | B65G 17/086 |
| 2002/0179417 A1* | 12/2002 | Cediel | B29C 45/0013 |
| | | | 198/852 |

FOREIGN PATENT DOCUMENTS

WO 9965801 A1 12/1999

OTHER PUBLICATIONS

International Search Report and Written Opinion of the International Searching Authority, PCT/US2016/015896, mailed May 19, 2016, Korean Intellectual Property Office, Daejeon, Republic of Korea.

* cited by examiner

*Primary Examiner* — Mark A Deuble
(74) *Attorney, Agent, or Firm* — Catherine M. Bishop

(57) ABSTRACT

A conveyor belt module comprises a module body and offset hinge elements extending from each end of the module body. On one end, the hinge elements include a progressively widening hinge passageway having hinge openings extending at different angles. The hinge openings progressively widen in a stepped manner to facilitate load sharing.

16 Claims, 4 Drawing Sheets

CONVEYOR BELT MODULE WITH STEPPED HINGE PASSAGEWAY

RELATED APPLICATIONS

This application claims priority to U.S. Provisional Patent Application No. 62/112,486, filed Feb. 5, 2015, entitled "Conveyor Belt Module with Stepped Hinge Passageway", the contents of which are herein incorporated by reference.

BACKGROUND OF THE INVENTION

The invention relates generally to power-driven conveyors and more particularly to modular plastic conveyor belts.

Modular plastic conveyor belts are widely used in various industries to convey products. Modular plastic conveyor belts are constructed of a series of rows of side-by-side belt modules, or rows of belt modules that span the length of the belt. Hinge openings opposite ends of each row interleave with hinge eyes of consecutive rows. A hinge rod inserted in the interleaved hinge openings connects the rows together at hinge joints into an endless conveyor belt loop.

Certain modular plastic conveyor belts may be designed to follow paths that include straight portions and curved portions. Belts capable of flexing sideways to follow curved paths are referred to as radius belts, or side-flexing belts. As a radius belt negotiates a turn, the belt must fan out because the edge of the belt at the outside of the turn follows a longer path than the edge at the inside of the turn. To enable the belt to fan out, the hinge openings on one end of each row are typically elongated in the direction of belt travel. The elongated openings allow the belt to collapse at the inside of a turn and to spread at the outside.

The requirement of following a curved path causes problems not found in straight-running belts. For example, because the elongated openings of conventional radius belts are identical in length across the width of the belt, few of the hinge element ends at the outside of a turn bear the entire belt pull. On a straight run, the belt pull is distributed across the entire width of the belt. Unless the outer hinge elements are specially bolstered, the belt pull strength rating is limited by the pull strength in a turn, which is often up to ten times less than on a straight. Thus, radius belts must be heavier and stronger than straight-running belts conveying the same load. Because the overall scale of structures and discontinuities on heavier belts is greater than on lighter belts, heavier belts are more likely to trip products such as beverage containers with small feet.

SUMMARY OF THE INVENTION

A conveyor belt module comprises a module body and offset hinge elements extending from each end of the module body. On one end, the hinge elements include a stepped hinge passageway having hinge openings extending at different angles. The hinge openings progressively widen to facilitate load sharing.

According to one aspect, a conveyor belt module comprises a module body, a first hinge element, a second hinge element and a third hinge element. The first hinge element extends from a first end of the module body and has a first hinge opening bounded by a first distal bearing surface that extends along a first axis. The second hinge element extends from the first end of the module body and has a second hinge opening bounded by a second distal bearing surface that extends along a second axis different from the first axis. The third hinge element extends from the first end of the module body and has a third hinge opening bounded by a third distal bearing surface that extends along a third axis different from the first axis and the second axis.

According to another aspect, a conveyor belt module, comprises a module body, a first hinge element extending from a first end of the module body, the first hinge element having a first hinge opening bounded by a first distal bearing surface that extends along a first axis and a second hinge element extending from the first end of the module body, the second hinge element having a second hinge opening bounded by a second distal bearing surface that extends along a second axis. The second axis is offset from and parallel to the first axis.

According to another aspect, a method of manufacturing a conveyor belt module, comprises the steps of inserting a coring pin having a jagged taper into a mold and infection molding a conveying belt module having a module body and a first set of hinge elements extending from a first end of the module body, the first set of hinge elements having a progressively widening hinge passageway defined by the coring pin.

BRIEF DESCRIPTION OF THE DRAWINGS

These features and aspects of the invention, as well as its advantages, are better understood by referring to the following description, appended claims, and accompanying drawings, in which:

DETAILED DESCRIPTION OF THE INVENTION

A conveyor belt module employs a stepped hinge passageway to facilitate load transfer. The invention will be described below relative to certain illustrative embodiments, though those skilled in the art will recognize that the invention is not limited to the described embodiments.

Figure 1:
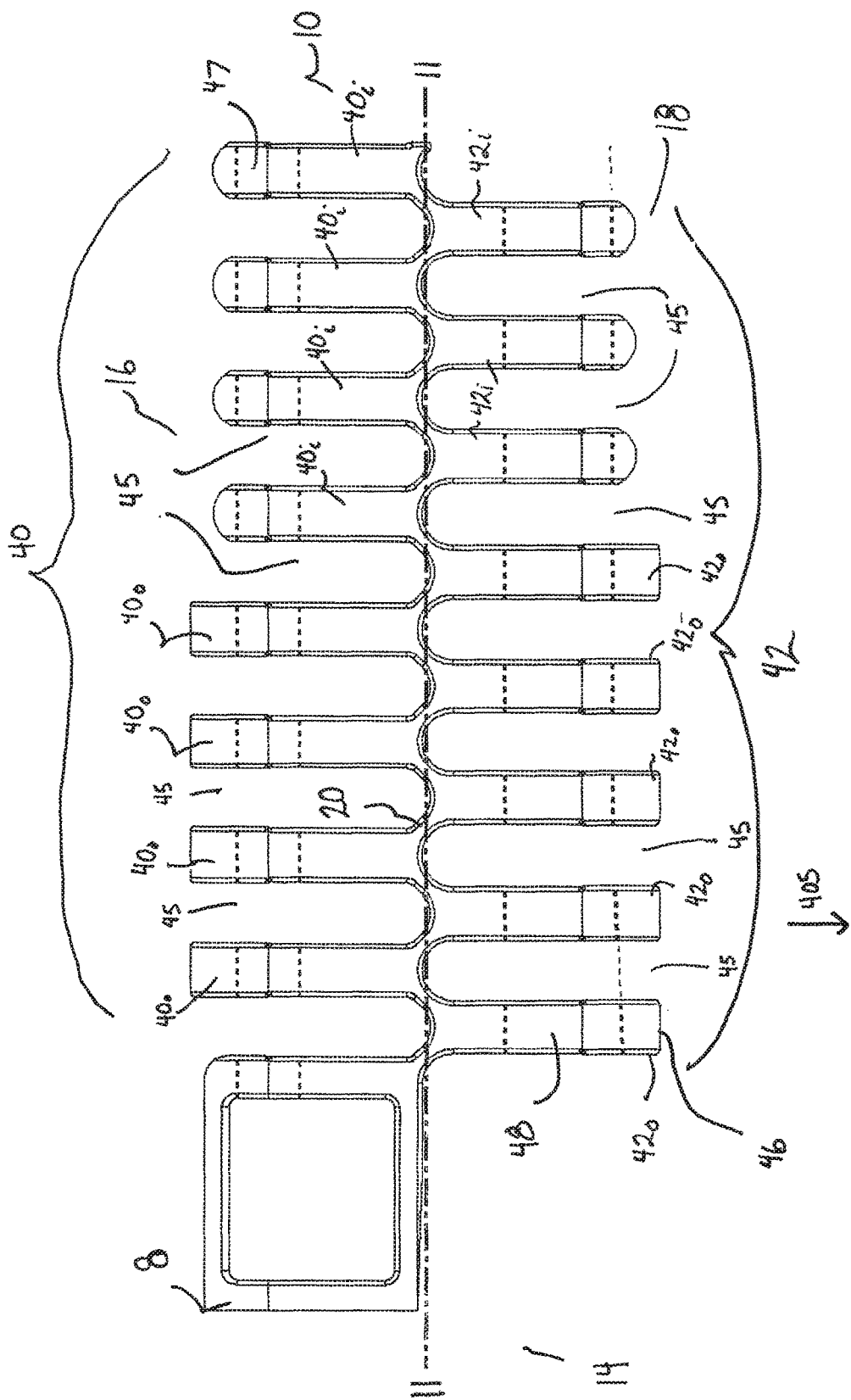
FIG. 1 is cross-sectional top view of a portion of a conveyor belt module including stepped hinge openings according to an embodiment of the invention.
Figure 2:
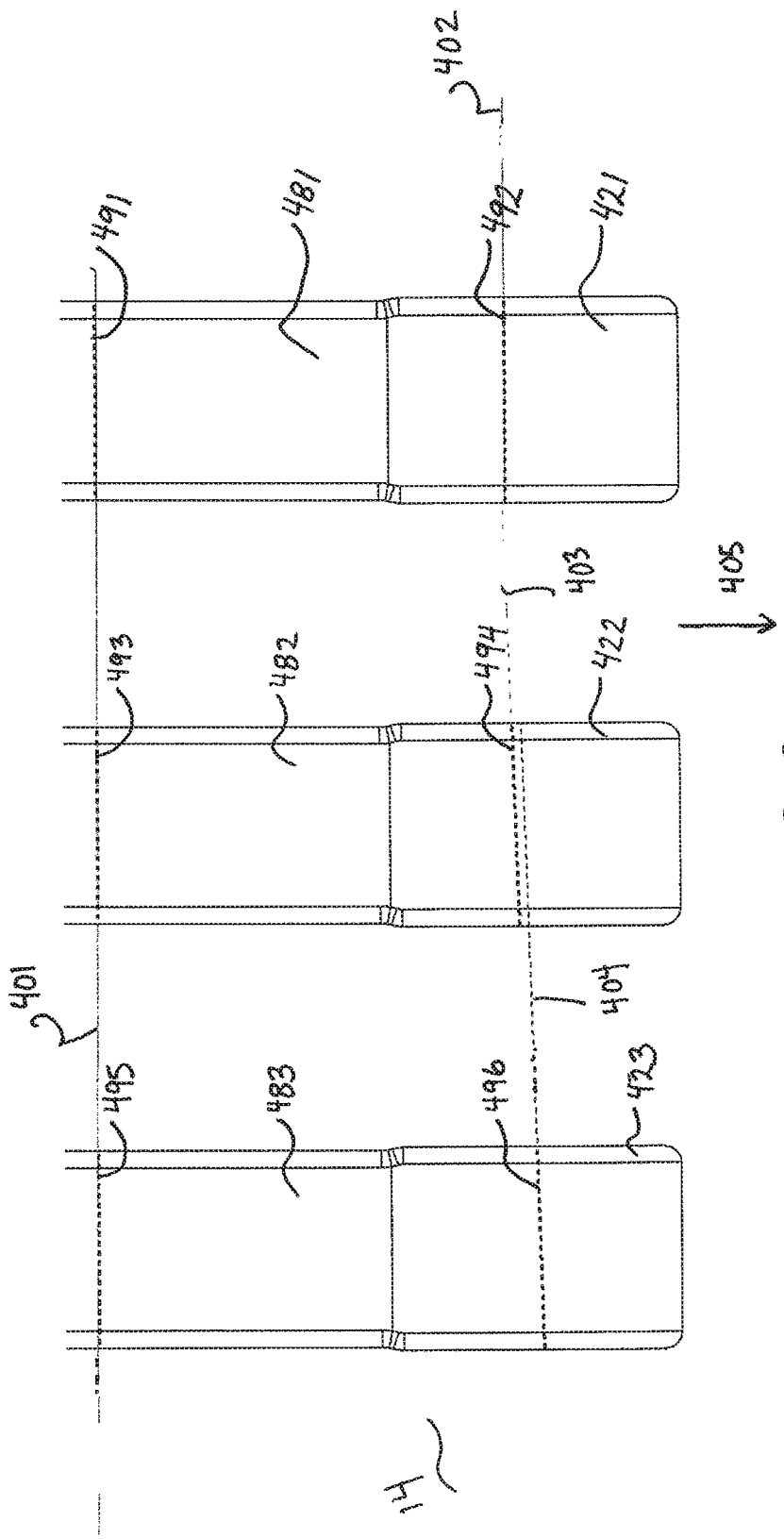
FIG. 2 is a cross-sectional top view of the radially outer portion of the conveyor belt module of FIG. 1.
Figure 3:
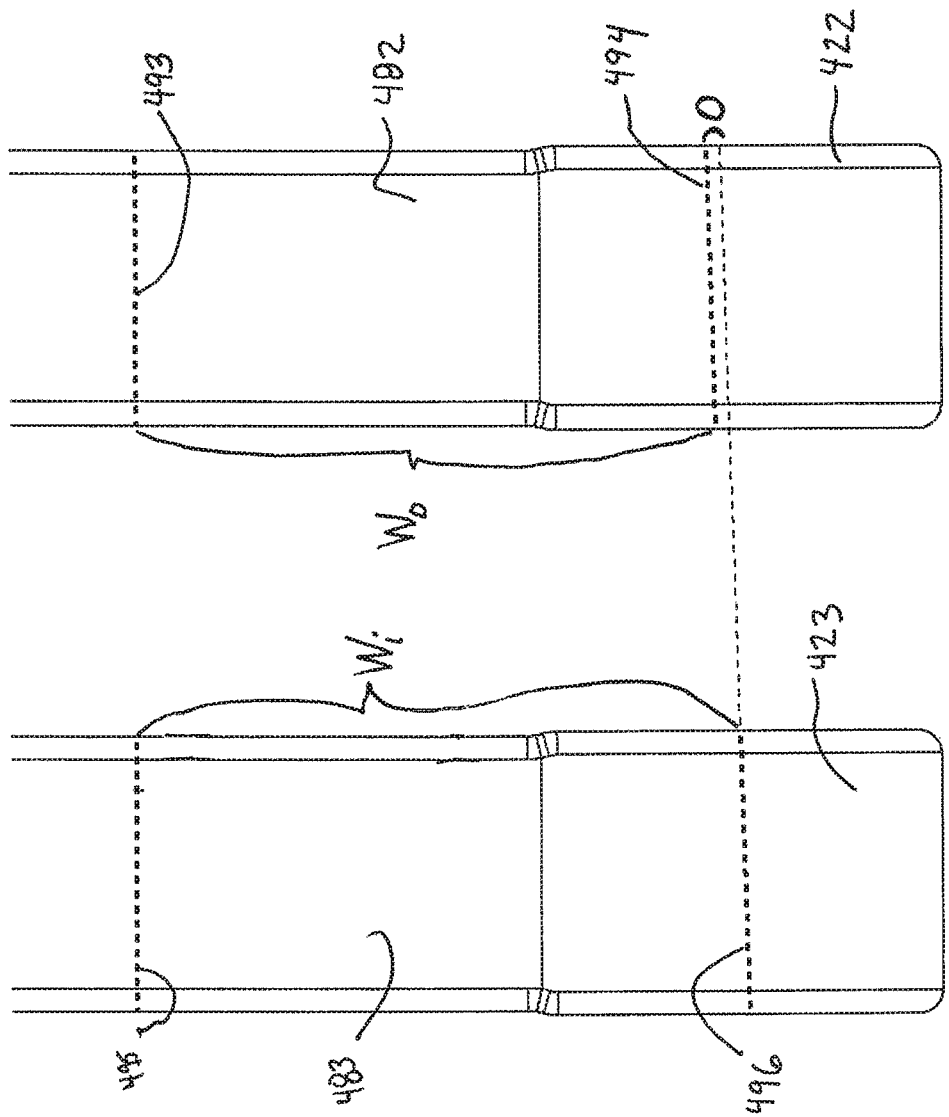
FIG. 3 is a detailed cross-sectional top view of the two radially outer hinge elements of the conveyor belt module of FIG. 1.

Referring to FIGS. 1-3, an illustrative conveyor belt module 10 for a conveyor belt includes a module body and hinge structure. The illustrative module body comprises a central spine 20 extending laterally across a substantial portion of the module and vertically from a top conveying surface to an opposite bottom surface. Though the illustrative spine 20 is corrugated and centered along lateral axis 11, which is perpendicular to the direction of belt travel, the module body may have any suitable size, shape and configuration and is not limited to the illustrated spine. in one embodiment, the central spine 20 includes an upper web or other feature to minimize gaps in the assembled conveyor belt. One side of the module includes an end section 8 including rod-locking elements for locking a hinge rod in place.

Hinge elements, shown as hinge eyes 40, 42, extend longitudinally outward from each end of the central spine 20 in the direction of belt travel 405. The hinge eyes 40 on a first end of the spine 20 are laterally offset from the hinge eyes 42 at the second end. Gaps 45 between laterally consecutive hinge eyes are sized to receive the hinge eyes of similar modules in an adjacent row of modules in a conveyor belt.

The hinge elements 40, 42 include hinge openings forming a hinge passageway 47, 48 on each end of the module. The hinge passageways 47, 48 admit a hinge rod to join two modules together. The hinge passageways are configured to distribute tension during turns in the conveyor belt. In one embodiment, the hinge passageway 48 progressively widens towards a radially outer edge of the belt.

The module 10 extends from a radially inner edge (not shown) to a radially outer edge 14 and is defined by a first end 16, a second end 18 opposite the first end 16, a top conveying surface and the opposing bottom surface.

The modules are preferably made of a thermoplastic polymer, such as polypropylene, polyethylene, acetal, or composite polymers, in an injection-molding process. Plastic conveyor belt modules made in this way are available commercially from Intralox, L.L.C., of Harahan, La., USA. In another embodiment, the modules are formed of stainless steel or another suitable material.

A number of modules 10 are used to form a conveyor belt. The belt may comprise a series of rows of edge-to-edge belt modules. The rows are interconnected by hinge rods extending laterally through the passageways formed by the aligned openings in the interleaved hinge eyes between adjacent rows. The belt conveys articles atop the conveying surfaces of the modules along an upper carryway portion of a conveyor.

In one embodiment, hinge elements $40_o$ and $42_o$ on the radially outer portion of the module are longer than the hinge elements $40_i$ and $42_i$ in the radially inner portion of the module. In one embodiment, the end surfaces 46 of the outer hinge elements can be angled to form a wedge-shape.

Each hinge element 40, 42 circumscribes a hinge opening forming a part of a hinge passageway 47 or 48. The distal ends of each hinge opening is bounded by a wall forming an outer bearing surface that engages a hinge rod and through which belt pull is transmitted as the belt operates. The inner end of each hinge opening is bounded by a wall forming an inner bearing surface. In the illustrative embodiment, the hinge openings forming the hinge passageway 47 of the first set of hinge elements 40 are aligned along a first pivot axis that is transverse to the direction of belt travel 405. The illustrative hinge openings of the hinge passageway 47 are substantially circular, though the invention is not so limited.

At least some of the hinge openings in the second set of hinge elements 42 are elongated in the direction of belt travel 405 to allow turning of the belt and may also be configured to facilitate had transfer. Referring to FIGS. 2 and 3, the hinge passageway 48 on the second set of hinge elements 42 is stepped to progessively widen to facilitate the transfer of load between modules during the operation of the conveyor belt.

The hinge passageway 48 progressively widens towards the radially outer edge 14. In one embodiment, shown in FIGS. 2 and 3, a first of the outer hinge elements 421 includes a hinge opening 481 having an inner bearing surface 491 extending along a first axis 401 and an outer bearing surface 492 extending along a second axis 402. The illustrative outer bearing surface 492 extends transverse to the direction of belt travel (parallel to the lateral axis 11), though alternatively, the outer bearing surface 492 may extend obliquely relative to the direction of belt travel 405.

A second of the outer hinge elements 422 adjacent the first outer hinge element 421 includes a hinge opening 482 that is wider than the first hinge opening 481. The second hinge opening 482 has an inner bearing surface 493 extending along the first axis 401 and an outer bearing surface 494 extending along a third axis 403. The illustrative third axis 403 extends obliquely to the second axis 402.

A third outer hinge element 423 includes a wider and widening hinge opening 483. The outermost hinge opening has an inner bearing surface 495 extending along the first axis 401 and an outer bearing surface 496 extending along a fourth axis 404. The illustrative fourth axis 404 is parallel to and stepped outward from the third axis 403.

Thus, the inner ends of the second hinge openings 421, 422, 423 are aligned along a transverse axis, while the distal ends are unaligned and may be stepped. In this manner, the hinge openings 48 grow larger in a noncontinuous manner towards the radially outer end of the module.

The second outer bearing surface 494 extends at an oblique angle relative to the first outer bearing surface 492. In one embodiment, the second outer bearing surface extends between about 0.05° and about 3° relative to the transverse surface 492 and the lateral axis 11, and between about 1° and about 2°. The illustrative angle between the transverse outer bearing surface 492 and the oblique bearing surface 494 is about 1.2°.

The third outer bearing surface 496 is stepped and offset outward (distally) from the second outer bearing surface 494. In the illustrative embodiment, the surfaces 494, 496 are parallel, though the invention is not so limited. The width $W_i$ of the opening 483 at the radially inner end is greater than the width $W_o$ of the adjacent opening 482 at the radially outer end. The illustrative offset O between axis 403 and axis 404 is about 0.005 and 0.03 inches and is preferably about 0.01 inch.

While the illustrative bearing surfaces 494 and 496 extend obliquely, alternatively, the bearing surfaces may be parallel to and stepped progressively outward relative to each other and may extend transverse to the direction of belt travel 405 (and parallel to axis 11).

In another embodiment, the bearing surface 496 is non-parallel to the bearing surface 494. For example, the bearing surface 496 may extends at a different angle relative to the lateral axis 11. In one embodiment, the bearing surface 496 may extend at a larger angle relative to the transverse axis 402 so that the hinge opening 483 widens at a greater rate than the hinge openings 482.

The module 10 may include several hinge openings with unaligned bearing surfaces, and the invention is not limited to three unaligned hinge openings.

While the illustrative inner surfaces 491, 493 and 495 are aligned along a first axis that is perpendicular to the direction of belt travel, alternatively one or more of the inner surfaces may be offset or staggered or otherwise unaligned, or the first axis can extend obliquely relative to the lateral axis 11, or be oriented in any suitable manner.

Figure 4:
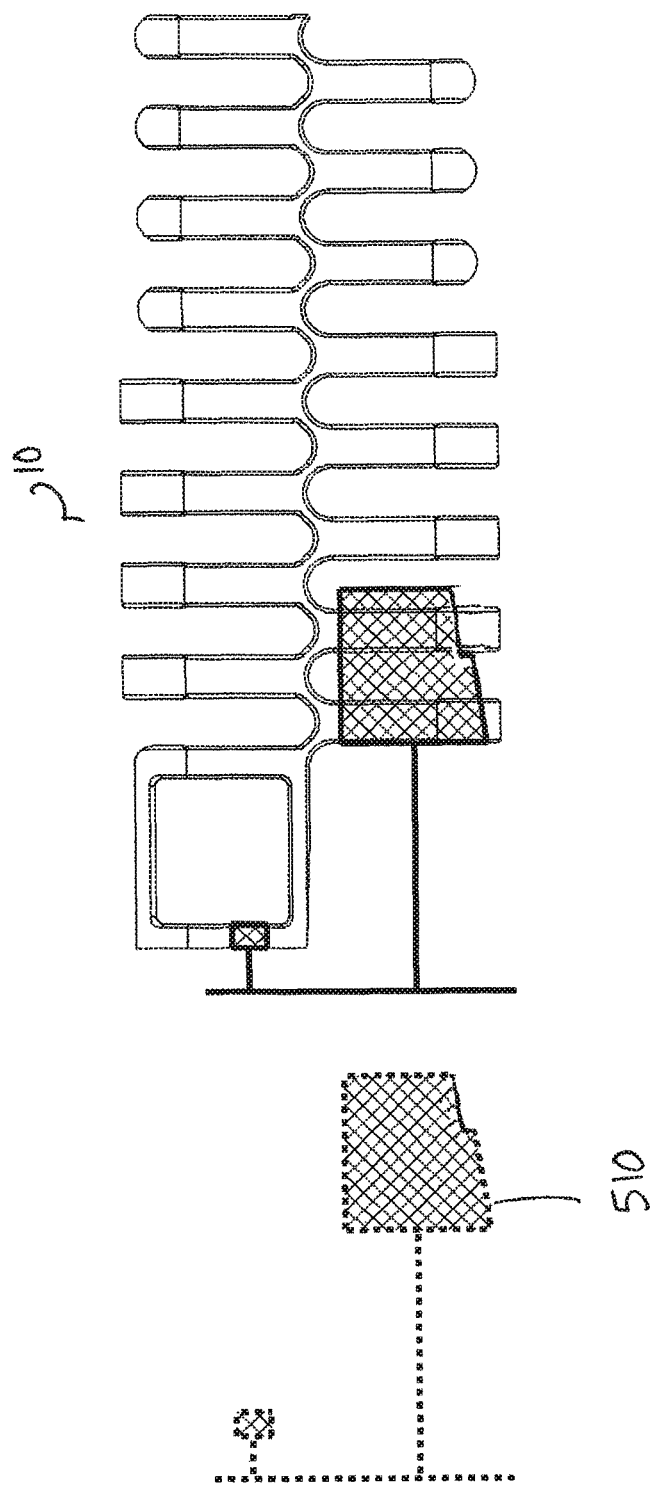
FIG. 4 shows the conveyor belt module of FIG. 1 with a jagged core pin used to form a stepped hinge passageway according to an embodiment of the invention.

Referring to FIG. 4, to form the stepped hinge passageway 48, a core pin 510 having a jagged taper may be used to form the stepped hinge passageway 48.

The stepped hinge passageway allows more load with less stress and facilitates transfer of load between modules, facilitating operation of a belt comprising the modules 10.

Although the invention has been described in detail with reference to a few exemplary versions, other versions are possible. The scope of the claims is not meant to be limited to the versions described in detail.

What is claimed is:
1. A conveyor belt module comprising:
   a module body;

a first hinge element extending from a first end of the module body, the first hinge element having a first hinge opening bounded by a first distal bearing surface that extends along a first axis;

a second hinge element extending from the first end of the module body adjacent the first hinge element, the second hinge element having a second hinge opening bounded by a second distal bearing surface that extends along a second axis different from the first axis; and a third hinge element extending from the first end of the module body adjacent the second hinge element, the third hinge element having third hinge opening bounded by a third distal bearing surface that extends along a third axis different from the first axis and the second axis.

2. The conveyor belt module of claim 1, wherein the second axis and third axis are parallel to each other.

3. The conveyor belt module of claim 1, wherein the second axis extends obliquely relative to the first axis at an angle of between about 0.05° and about 3°.

4. The conveyor belt module of claim 1, wherein the first, second and third hinge openings have inner bearing surfaces that are aligned along a fourth axis.

5. The conveyor belt module of claim 1, wherein the third hinge opening is wider than the second hinge opening.

6. The conveyor belt module of claim 5, wherein the second hinge opening is wider than the first hinge opening.

7. The conveyor belt module of claim 1, wherein the second third hinge openings are elongated in a direction of belt travel.

8. A conveyor belt module, comprising:
a module body;
a first hinge element extending from a first end of the module body, the first hinge element having a first hinge opening bounded by a first distal bearing surface that extends along a first axis; and a second hinge element extending from the first end of the module body, the second hinge element having a second hinge opening bounded by a second distal bearing surface that extends along a second axis, the second axis offset from and parallel to the first axis.

9. The conveyor belt module of claim 8, where the second axis is offset in a distal direction from the second axis.

10. The conveyor belt module of claim 8, wherein the second axis is offset by a distance of between about 0.005 inches and about 0.02 inches from the first axis.

11. The conveyor belt module of claim 8, wherein the first and second hinge openings have inner bearing surfaces that are aligned along a third axis.

12. The conveyor belt module of claim 8, further comprising a third hinge element having a third hinge opening bounded by a third distal bearing surface that extends along a third axis.

13. The conveyor belt module of claim 12, wherein the third axis is different from the first axis and second axis.

14. The conveyor belt module of claim 8, wherein the first and second axes extend transverse to a direction of belt travel.

15. The conveyor belt module of claim 8, wherein the first and second axes extend obliquely to a direction of belt travel.

16. A method of manufacturing a conveyor belt module, comprising the steps of:
inserting a coring pin having a jagged taper into a mold, the jagged taper including walls that are offset from and parallel to each other; and injection molding a conveying belt module having a module body and a first set of hinge elements extending from a first end of the module body, the first set of hinge elements having a progressively widening hinge passageway defined by the coring pin.

* * * * *